United States Patent [19]
Huybrechts

[11] Patent Number: 5,886,125
[45] Date of Patent: Mar. 23, 1999

[54] CROSSLINKABLE COPOLYMERS COMPRISING VINYL SILANE AND VINYL ESTERS OF BRANCHED FATTY ACID

[75] Inventor: Josef Huybrechts, Oud-Turnhout, Belgium

[73] Assignee: E. I. du Pont de Nemours and Company, Wilmington, Del.

[21] Appl. No.: 805,546

[22] Filed: Feb. 25, 1997

[51] Int. Cl.⁶ .......................... C08G 77/20; C08G 77/04; C08F 8/00

[52] U.S. Cl. .............................. 528/32; 528/28; 524/534; 524/558; 524/588; 524/590; 525/101; 525/123; 525/455

[58] Field of Search ..................................... 524/539, 558, 524/588, 590; 252/101, 123, 455; 528/28, 32

[56] References Cited

U.S. PATENT DOCUMENTS

| | | | |
|---|---|---|---|
| 3,729,438 | 4/1973 | Plesich et al. | 260/29.6 |
| 3,814,716 | 6/1974 | Kowalski et al. | 260/29.6 |
| 3,928,684 | 12/1975 | Buning et al. | 428/297 |
| 4,039,463 | 8/1977 | DeRoo et al. | 252/62.1 |
| 4,191,173 | 3/1980 | Yonezawa et al. | 525/102 |
| 4,199,490 | 4/1980 | Kamiya et al. | 260/29.7 |
| 4,349,603 | 9/1982 | Kameyama et al. | 428/334 |
| 4,397,989 | 8/1983 | Adesko | 525/162 |
| 4,503,181 | 3/1985 | Kato et al. | 524/391 |
| 4,567,221 | 1/1986 | Maruyama et al. | 524/436 |
| 4,749,727 | 6/1988 | Tsuchiya | 522/170 |
| 4,795,783 | 1/1989 | Hunt | 525/101 |
| 4,820,682 | 4/1989 | Shimomura et al. | 503/207 |
| 4,879,345 | 11/1989 | Connelly et al. | 525/104 |
| 4,886,862 | 12/1989 | Kuwamura et al. | 526/247 |
| 4,888,399 | 12/1989 | Ryntz | 525/440 |
| 4,927,871 | 5/1990 | Ohori et al. | 524/230 |
| 5,073,578 | 12/1991 | Boodaghains et al. | 523/201 |
| 5,115,014 | 5/1992 | Wakabayahi et al. | 524/506 |
| 5,162,426 | 11/1992 | Hazan et al. | 524/521 |
| 5,182,174 | 1/1993 | Stephenson | 428/450 |
| 5,198,503 | 3/1993 | Numa et al. | 525/288 |
| 5,244,696 | 9/1993 | Hazan et al. | 427/402 |
| 5,244,959 | 9/1993 | Hazan et al. | 524/504 |
| 5,250,605 | 10/1993 | Hazan et al. | 524/504 |
| 5,252,660 | 10/1993 | Hazan et al. | 524/504 |
| 5,312,861 | 5/1994 | Meverden et al. | 524/521 |
| 5,369,153 | 11/1994 | Barsotti et al. | 523/429 |
| 5,459,205 | 10/1995 | Furukawa et al. | 525/846 |
| 5,532,027 | 7/1996 | Nordstrom et al. | 427/493 |
| 5,684,084 | 11/1997 | Lewin et al. | 524/590 |
| 5,703,155 | 12/1997 | Swarup et al. | 524/558 |

FOREIGN PATENT DOCUMENTS

| | | | |
|---|---|---|---|
| 327 376 A2 | 2/1989 | European Pat. Off. | C08F 218/04 |
| 1247 346 | 1/1968 | United Kingdom . | |
| 2 192 400 | 1/1988 | United Kingdom | C09D 5/14 |

OTHER PUBLICATIONS

Palluel, A.L.L., Novel Aqueous Dispersion Polymers, *Makromol. Chem. Macromol Symposia*, 35/6, 509–26, 1990.

Watkins, M. J., Glycidyl Neodecanoate: A Tool for Designing Coatings Resins, *Mod. Paint Coatings*, 83, 120–6, 1993.

Vermeulen, J., Konner, W., Formulation of Emulsion Paints for Indoor and Outdoor Use, *Farbe Lack*, 98, 767–70, 1992.

Arz, C., Syntheses of Vinyl Acetate/Vinyl Ester/Diallyl Maleate Terp, *Macromol. Reports*, A31, 1225–8, 1994.

Aten, W.C., VeoVa 10 Based Mass Polymers as Binders for Solvent–borne Industrial Coatings, *J. Oil & Chem. Assn.*, 64, 469–79, 1981.

Russell, G., Surface Coating Resin Developments at Chemical Research Ctr, *J. Oil & Col. Chem. Assn.*, 71, 196, 1988.

Dargan D S W, High Binders in Decorative Emulsion Paints, *J. Oil & Col. Chem. Assn*, 70, 183–8, 1987.

Ultren, L.; Hjertberg, T., Adhesion Between Aluminium and Copolymers of Ethylene, *J. Appl. Polym. Sci.*, 37, 1269–85, 1989.

Hayat, Umar, Improved Process for Producing Well–Adhered/Abrasion, *M. Macromol. Sci. Pure Appl. Chem.*, 131(6, 665–75, 1994.

Reader C E L, Veova Latices for Modern Emulsion Paints, *Surface Coating Australia*, 22, 11–6, 1985.

Aten, W., Coppin, L., Slinckx, M., Performance of Vinyl Esters of Versatic Acids in Vinyl, *Proc. PRA Second Asia–Pacific Conf. "Advances in Coatings"*, 17, 12 pp., 1992.

Scholten, H., Vermeulen, J., Recent Developments in Latices Based on Vinyl Esters, *Proc. Paint RA 7th Internat. Conf. "Water–Borne Coatings"*, 1–30, 1987.

Scholten, H.P.H., Van Westrenew, W. J., Vinyl and Glycidyl Esters in Modern Binder Design, *Paint & Ink Internat.*, 4, 8–12, 1991.

Reader C E L, Veova Latices for Emulsion Paints, *Paintindia*, 36, 23, 1986.

(List continued on next page.)

*Primary Examiner*—James C. Housel
*Assistant Examiner*—Rodney P. Swartz
*Attorney, Agent, or Firm*—James A. Costello

[57] ABSTRACT

A copolymer composition and coating comprising the copolymer composition containing a vinyl silane of the formula

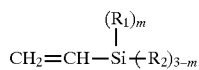

$$CH_2=CH-Si\displaystyle{\mathop{(R_2)_{3-m}}^{(R_1)_m}}$$

where $R_1$ is an aryl or alkyl group having 1 to 10 carbon atoms and $R_2$ is a hydrolysable group; and a vinyl ester of a branched fatty acid having the formula

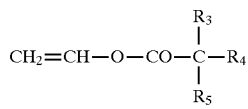

$$CH_2=CH-O-CO-\underset{R_5}{\overset{R_3}{\underset{|}{\overset{|}{C}}}}-R_4$$

wherein $R_3$, $R_4$, $R_5$ are hydrogen or alkyl groups with 1 to 12 carbon atoms and wherein the total of $R_3$, $R_4$ and $R_5$ contain at least 3 carbon atoms and optionally at least one olefinically unsaturated compound.

17 Claims, No Drawings

OTHER PUBLICATIONS

Jewell, G. W., Latex Properties: Effect of Monomer Composition, "*Surface Coatings, vol. I. Raw Materials and Their Usage*", 303–19, 1993.

Sabatier, L. Glaze A.P., Novel Comonomers for Emulsion Polymerisation, *Surface Coatings Internat. Jocca,* 76, 288–91, 1993.

Slinckx, M.M.C.P., Scholten, H.P.H., Branched Vinylester/(Meth)Acryates, a New Class of Emulsion, *Surface Coatings Internat. Jocca,* 77, 107–112, 1994.

Sellars K, Vinyl Acetate/Veova 10 Copolymer for High PVC Paints, *Paint & Resin,* 52, 11,14, 1982.

Andre, O; Decocq, F.; Heymans, D.; Spanhove, S., Vinyl Ester Copolymers: Reliable and Versatile Binders for Emulsion Paints, *Proc. PRA 2nd Middle East Conf. "Technical Devleopments in Coatings",* 2, 11, 1995.

Scholten, H.P.H., Van Westrenen, W.J., Cardura and VeoVa, Your Partners in Binder Design, *Polymers, Paint, Colour Journal,* 180, 4272, 1990.

Aten, W. C., Influence of Surfactant Distribution on Water Resistance, *Proc. Plastics & Rubber Inst. Conf. "Emulsion Polymers" London,* 4, 11, 1992.

Andre, O., Gerets, C., Hydroxy–Functional Building Blocks for Polyesters, *Europ. Coatings J.,* 12, 914–20, 1993.

Scholten, H., Slinckx, M., New Class of Emulsion Copolymers, *Europ. Coatings J.,* 12, 865, 1991.

Slinckx, M., Daniel, M.F., Proprietary Vinyl Ester/(Meth-)Acrylate Latices: High Quality, *Proc. Pra 24th Internat. Conf. "Coatings, Community and Care."* 10, 8, 1994.

CROSSLINKABLE COPOLYMERS COMPRISING VINYL SILANE AND VINYL ESTERS OF BRANCHED FATTY ACID

BACKGROUND OF THE INVENTION

1. Field of the Invention

The present invention relates to a curable resin and more particularly to a curable resin having hydrolysable silyl groups on the side chains.

2. State of the Art

U.S. Pat. No. 5,459,205 discloses a curable resin based on prepolymers with hydrolyzable silyl groups copolymerized with short chain vinyl derivatives such as vinyl acetate, vinylpropionate and silane functional monomers such as trialkoxy vinyl silanes. EP 0 396 914 discloses top coat compositions based on a blend of a hydroxyl group resin and a hydrolysable silyl group—containing polymer. Neither publication discloses copolymers comprising vinyl esters of branched fatty acids.

Japanese Patents 63/027564, 04057820, and 04288376 disclose high molecular weight coating compositions containing vinyl silane monomers, vinyl ethers and vinyl esters of branched fatty acids which are fluoro-modified.

None of the prior art teaches curable resins such as disclosed herein. The compositions of this invention give an excellent balance of solvent resistance, chemical resistance, hardness, flexibility and adherence to a variety of substrates. More specifically, such compositions can be used in automotive top coat formulations where they give an exterior finish having attractive aesthetic appearance, including high gloss, excellent distinctness of image (DOI) and protection against environmental chemical attack.

SUMMARY OF THE INVENTION

This invention concerns a crosslinkable polymeric composition having a weight average molecular weight below about 40,000 and an acid value below about 20 mg KOH/gram derived from A, B and optionally C, wherein:

A is 5 to 95% by weight of A, B and C of a vinyl silane having the formula:

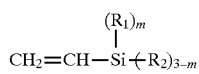

where $R_1$ is an aryl or alkyl group having 1 to 10 carbon atoms and $R_2$ is a hydrolysable group;

B is 5 to 95% by weight of a vinyl ester of a branched fatty acid having the formula

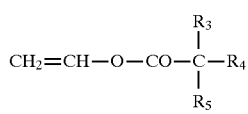

wherein $R_3$, $R_4$, $R_5$ are hydrogen or alkyl groups with 1 to 12 carbon atoms and wherein the total of $R_3$, $R_4$ and $R_5$ contain at least 3 carbon atoms; and C is 0 to 90% by weight of a different polymerizable olefinically unsaturated compound.

Preferred ranges of A, B and C are:

A is 10 to 60%

B is 10 to 90%

C is 5 to 60%.

More preferred are:

A is 10 to 50%

B is 10 to 50%

C is 10 to 50%.

Preferred vinyl silanes are those wherein m=0 and $R_2$ is methoxy or ethoxy.

Preferred vinyl esters are those derived from branched fatty acids such as pivalic acid wherein $R_3$, $R_4$ and $R_5$ are each methyl; versatic acid 9, 10 or 11 wherein the total number of carbon atoms in $R_3$, $R_4$ and $R_5$ are 7, 8, and 9, respectively. Most preferred branched fatty acids are versatic 9 and versatic 10.

Preferred molecular weights are between about 1,000 to 15,000 (weight average).

Preferred compositions have hydroxyl values (by titration; mg KOH/gram) from about 20 to 160. More preferred are values from about 50 to 130.

Optional component C is preferably selected form vinyl aromatic (meth) acrylates, and derivatives of maleic, fumaric and itaconic acids.

This invention also concerns 3-component coating compositions comprising, as component (i), a combination of A, B or A, B and C; as component (ii) a nonaqueous dispersion of a polymer in a substantially nonaqueous medium and, as component (iii), a melamine and/or isocyanate crosslinking agent. Preferred coating compositions comprise:

(i) from 20 to 80 percent by weight of a composition of A, B and optionally C;

(ii) from 10 to 40 percent by weight of a nonaqueous dispersion of a polymer in a substantially nonaqueous medium; and (iii) from 10 to 70 percent by weight of a crosslinking agent selected from one or both of an isocyanate and melamine crosslinker.

Preferred coating compositions are those wherein (i) is present from about 40 to 70 percent by weight and contains a combination of A, B and C; (ii) is present from about 10 to 30 percent by weight and (iii) from 10 to 50 percent. Also included within the scope of this invention are substrates coated with the coating composition disclosed herein.

DETAILS OF THE INVENTION

Component (i)

The polymeric compositions of this invention have particular utility in coatings that display good mar and etch resistance. Such coatings typically comprise crosslinkers such as melamine resins, blocked or unblocked isocyanates, and mixtures thereof. Other components can be added as will be obvious to one skilled in the art to obtain improved properties. A catalyst is typically added to catalyze the crosslinking of the silane moieties of the silane polymer with itself and with other components of the composition, including the dispersed polymer. Typical of such catalysts are dibutyl tin dilaurate, dibutyl tin diacetate, dibutyl tin dioxide, dibutyl tin dioctate, tin octoate, aluminum titanate, aluminum chelates, zirconium chelate and the like. Tertiary amines and acids or combinations thereof are also useful for catalyzing silane bonding. Preferably, these catalysts are used in the amount of about 0.1 to 5.0% by weight of the composition.

To improve weatherability of a clear finish produced by the present coating composition, an ultraviolet light stabilizer or a combination of ultraviolet light stabilizers can be added in the amount of about 0.1 to 5% by weight, based on the weight of the binder. Such stabilizers include ultraviolet light absorbers, screeners, quenchers, and specific hindered amine light stabilizers. Also, an antioxidant can be added, in the amount of 0.1 to 5% by weight based on the weight of the binder.

Typical ultraviolet light stabilizers that are useful include benzophenones, triazoles, triazines, benzoates, hindered amines and mixtures thereof. The composition can also include conventional formulation additives such as flow control agents such as Resiflow® S (polybutylacrylate), BYK® 320 and 325 (high molecular weight polyacrylates), rheology control agents, such as fumed silica; water scavengers such as tetrasilicate, trimethyl orthoformate, triethyl orthoformate, and the like.

When the present composition is used as a clearcoat (topcoat) over a pigmented colorcoat (basecoat) to provide a colorcoat/clearcoat finish, small amounts of pigment can be added to the clear coat to eliminate undesirable yellowing. The composition also can be pigmented and used as the colorcoat, or as a monocoat or even as a primer or primer-surfacer. The composition has excellent adherence to a variety of substrates, such a previously painted substrates, cold rolled steel, phosphatized steel, and steel coated with conventional primers by electrodeposition. The present composition exhibits excellent adherence to primers, for example, those that comprise crosslinked epoxy polyester and various epoxy resins, as well as alkyd resin repair primers. The present composition can be used to coat plastic substrates such as polyester reinforced fiberglass, injection-molded urethanes and partially crystalline polyamides.

When the present coating composition is used as a basecoat, typical pigments that can be added to the composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones, metallic flake pigments such as aluminum flake, and the like.

The pigments can be introduced into the coating composition by first forming a mill base or pigment dispersion with any of the aforementioned polymer used in the coating compositions or with another compatible polymer or dispersant by conventional techniques, such as high speed mixing, sand-grinding, ball-milling, attritor-grinding or two roll-milling. The mill base is then blended with the other constituents used in the coating composition.

Conventional solvents and diluents are used to disperse and/or dilute the above mentioned polymers to obtain the coating composition. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, naptha, mineral spirits, heptane and other aliphatic, cycloaliphatic, and aromatic hydrocarbons, esters, ethers, ketones, and the like.

The coating composition can be applied by conventional techniques such as spraying, electrostatic spraying, dipping, brushing, flowcoating, and the like. The preferred techniques are spraying and electrostatic spraying. After application, the composition is typically baked at 100° to 150° C. for about 15 to 30 minutes to form a coating of about 0.1 to 3.0 mils thick. When the composition is used as a clearcoat, it is applied over the colorcoat which can be dried to a tack-free state and cured or preferably flash-dried for a short period before the clearcoat is applied. The colorcoat/clearcoat finish is then baked as mentioned above to provide a dried and cured finish.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

Upon curing of clear topcoat compositions of the present invention, a portion of the silane containing polymer may migrate and stratify to the top of the clearcoat, particularly when the organosilane polymer is used in combination with a polyol, so as to produce a durable, weather-resistant clearcoat. Such stratification has been shown by electron scanning chemical analysis (ESCA) of a cross-section of the cured layer of topcoat.

The coating composition can be formulated as a one-package system that has an extended shelf life.

For a two-component system, a polyfunctional organic isocyanate compound can be used without particular limitation so long as the isocyanate compound has at least two isocyanate groups in the one molecule. The preferable polyfunctional isocyanate compounds are isocyanate compounds having 2 to 3 isocyanato groups in the molecule.

Typical examples of the polyfunctional organic isocyanate compound are, for instance, hexamethylene diisocyanate, isophorone diisocyanate, 2,4-toluene diisocyanate, diphenylmethane-4,4'-diisocyanate, dicyclohexylmethane-4,4'-diisocyanate, xylylene diisocyanate, lysine methyl ester diisocyanate,

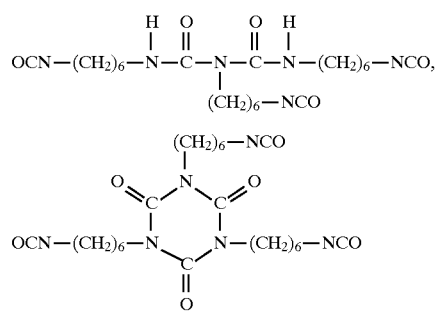

a trimer of isophorone diisocyanate (isocyanurate), and the like.

When the curable resin of the present invention is used in exterior coatings, the use of the aliphatic isocyanate or alicyclic isocyanate is preferable to the use of the aromatic isocyanate, from the viewpoints of weatherability and yellowing resistance.

Contemplated vinyl silane monomers useful as component(A) include:

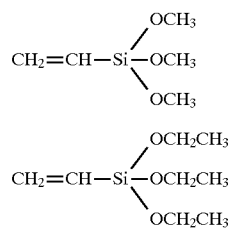

-continued

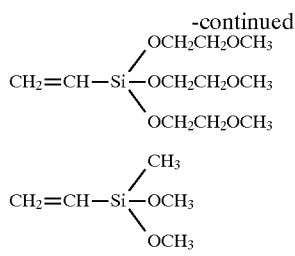

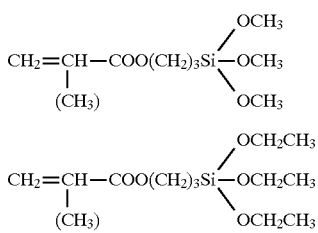

or other trialkoxy derivatives.

Preferred polymerizable compounds (C) which can be included in the formulation include reaction products of ε-caprolactone and hydroxy alkyl (meth)acrylates, reaction products of maleic acid, itaconic acid, and half esters with mono-functional epoxy esters such as Cardura E10 (Shell), epoxies such as ethylene oxide, propylene oxide, cyclohexene oxide, and glycidyl ethers such as phenylglycidyl ether and the like. Other possible polymerizable compounds are urethane adducts of hydroxy alkyl (meth)acrylates and diisocyanates to form an isocyanate functional monomer. Such monomers can be further modified with amino and/or hydroxy functional derivatives to form urethane or urea functional polymerizable intermediates.

Most preferred component (C) are the following maleic acid reaction products:

$$R_6-O-CO-CH=CH-CO-O-R_7$$

Contemplated vinyl esters of branched fatty acids (B) include:

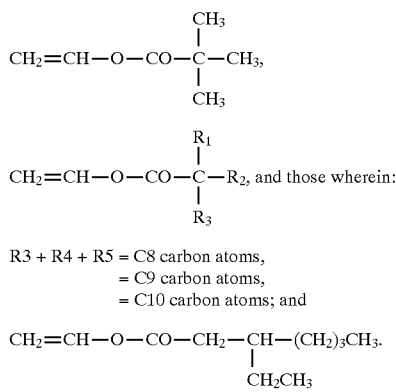

wherein $R_6$ and $R_7$ are the same or different and are selected from alkylene, cycloalkylene, aryl, aralkylene, and alkaryl, of up to about 20 carbon atoms, interrupted by or substituted by heteroatoms and/or hydroxyl groups. Examples of such reaction products are the following.

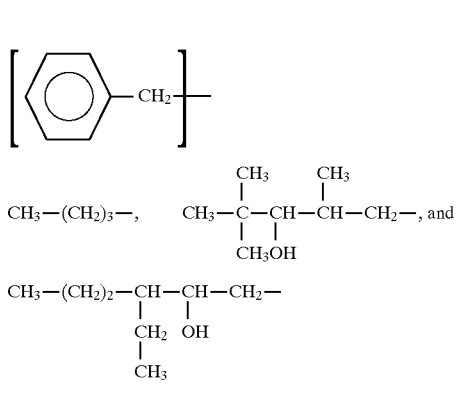

Optional component C includes: alkyl methacrylate monomers such as methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used such as trimethylcyclohexyl methacrylate, trimethylcyclohexyl acrylate, t-butyl cyclohexyl acrylate, or t-butyl cyclohexyl methacrylate. Aryl acrylate and aryl methacrylates also can be used such as benzyl acrylate and benzyl methacrylate. Of course, mixtures of two or more of the above mentioned monomers are also suitable.

In addition to alkyl acrylates or methacrylates, other polymerizable monomers, up to about 50% by weight of the non-silane-containing polymer, can be used in the acrylosilane polymer for the purpose of achieving the desired properties such as hardness, appearance mar resistance and the like. Exemplary of such other monomers are styrene, methyl styrene, acrylamide, acrylonitrile, methacrylonitrile, and the like.

To provide the hydroxy functionality in the polyol, suitable monomers include hydroxy alkyl acrylates and methacrylates, for example, hydroxy ethyl acrylate, hydroxy propyl acrylate, hydroxy ethyl acrylate, hydroxy propyl acrylate, hydroxy isopropyl acrylate, hydroxy propyl methacrylate, hydroxy isopropyl methacrylate, hydroxy butyl methacrylate, and the like, and mixtures thereof.

Other silane-functional monomers, C, can be used such as:

Component (ii)

This component of the coating composition of the invention is a polymer dispersed in an organic (substantially nonaqueous) medium. This component has been described heretofore as a nonaqueous dispersion (NAD) polymer, a microgel, a nonaqueous latex, or a polymer colloid. In general, the dispersed polymer is stabilized by steric stabilization accomplished by the attachment of a solvated polymeric or oligomeric layer at the particle medium interface.

In the dispersed polymers of the present composition, the dispersed phase or particle, sheathed by a steric barrier, is referred to as the "macromolecular polymer" or "core". The stabilizer forming the steric barrier, attached to this core, is referred to as the "macromonomer chains" or "arms".

The dispersed polymers solve the problem of cracking and are used in an amount varying from about 10 to 60% by weight, preferably about 15 to 40%, more preferably about 20 to 30%, of the total binder in the composition. The ratio of the silane compound to the dispersed polymer component of the composition suitably ranges from 5:1 to 1:2, preferably 4:1 to 1:1. To accommodate these relatively high concentrations of dispersed polymers, it is desirable to have reactive groups on the arms of the dispersed polymer, which reactive groups make the polymers compatible with the continuous phase of the system.

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.05 to 0.5 microns. The arms, attached to the core, make up about 10 to 90%, preferably 20 to 59%, by weight of the dispersed polymer, and have a weight average molecular weight of about 1,000 to 30,000, preferably 1,000 to 10,000.

The macromolecular core of the dispersed polymer typically comprises polymerized ethylenically unsaturated monomers. Suitable monomers include styrene, alkyl acrylate or methacrylate, ethylenically unsaturated monocarboxylic acid, and/or silane-containing monomers. Such monomers as methyl methacrylate contribute to high Tg (glass transition temperature) whereas such monomers as butyl acrylate or 2-ethylhexyl acrylate contribute to low Tg. Other optional monomers are hydroxyalkyl acrylates, methacrylates or acrylonitrile. Such functional groups as hydroxy in the core can react with silane groups in the silane compound to produce additional bonding within the film matrix. If a crosslinked core is desired, allyl diacrylate or allylmethacrylate can be used. Alternatively, an epoxy functional monomer such as glycidyl acrylate or methacrylate can be used to react with monocarboxylic acid-functional comonomers and crosslink the core; or the core can contain silane functionality.

A preferred feature of the dispersed polymers is the presence of macromonomer arms which contain hydroxy groups adapted to react with the organosilane compound. It is not known with certainty what portion of these hydroxy functional groups react with the organosilane compound because of the sets of reactions that occur during baking and curing. However, it can be said that a substantial portion of these functionalities in the arms, preferably the majority thereof, do react and crosslink with the film-former of the composition, which in some cases can exclusively consist of an organosilane compound.

The arms of the dispersed polymer should be anchored securely to the macromolecular core. For this reason, the arms preferably are anchored by covalent bonds. The anchoring must be sufficient to hold the arms to the dispersed polymer after they react with the film-former compound. For this reason, the conventional method of anchoring by absorption of the backbone portion of a graft polymer may be insufficient.

The arms or macromonomers of the dispersed polymer serve to prevent the core from flocculating by forming a steric barrier. The arms, typically in contrast to the macromonomer core, are believed capable, at least temporarily, of being solvated in the organic solvent carrier or media of the composition. They can be in chain-extended configuration with their hydroxy-functional groups available for reaction with the silane groups of the film-forming silane-containing compound and polymer. Such arms comprise about 3 to 30% by weight, preferably 10 to 20%, based on the weight of macromonomer, of polymerized ethylenically unsaturated hydroxy functionality-containing monomers, and about 70 to 95% by weight, based on the weight of the macromonomer, of at least one other polymerized ethylenically unsaturated monomer without such crosslinking functionality. Combinations of such hydroxy monomers with other lesser amounts of crosslinking functional groups, such as silane or epoxy, on the arms are also suitable.

The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typical useful hydroxy-containing monomers are hydroxyalkyl acrylates or methacrylates.

A preferred composition for a dispersed polymer that has a hydroxy functionality comprises a core consisting of about 25% by weight of hydroxyethyl acrylate, about 4% by weight of methacrylic acid, about 46.5% by weight of methyl methacrylate, about 18% by weight of methyl acrylate, about 1.5% by weight of glycidyl methacrylate and about 5% of styrene. The macromonomer attached to the core contains 97.3% by weight of prepolymer and about 2.7% by weight of glycidyl methacrylate, the latter for crosslinking or anchoring.

A preferred prepolymer contains about 28% by weight of butyl methacrylate, about 15% by weight of ethyl methacrylate, about 30% by weight of butyl acrylate, about 10% by weight of hydroxyethyl acrylate, about 2% by weight of acrylic acid, and about 15% by weight of styrene.

The dispersed polymer can be produced by dispersion polymerization of monomers in an organic solvent in the presence of a steric stabilizer for the particles. The procedure has been described as one of polymerizing the monomers in an inert solvent in which the monomers are soluble but the resulting polymer is not soluble, in the presence of a dissolved amphoteric stabilizing agent.

Component (iii)

The coating composition further includes, particularly in conjunction with a polyol polymer, an additional crosslinking agent, for example, conventionally known monomeric or polymeric alkylated melamine formaldehyde resin that is partially or fully alkylated. One preferred crosslinking agent is methylated and butylated or isobutylated melamine formaldehyde resin that has a degree of polymerization of about 1 to 3. Generally, this melamine formaldehyde resin contains about 50% butylated groups or isobutylated groups and 50% methylated groups. Such crosslinking agents typically have a number average molecular weight of about 300 to 600 and a weight average molecular weight of about 500 to 1,500. Examples of commercially available resins are Cymel® 1168, Cymel® 1161, Cymel® 1158, Resimine® 4514 and Resimine® 354. Preferably, the crosslinking agent is used in the amount of about 5 to 50% by weight, based on the weight of the binder of the composition. Other contemplated crosslinking agents are urea formaldehyde, benzoquanamine formaldehyde and blocked polyisocyanates.

Compositions of this invention can be made by the same techniques as those used in the synthesis of acrylic resins and vinyl resins. An example of such synthetic technology comprises dissolving or dispersing the respective component monomers in an organic solvent and heating the solution in the presence of a radical polymerization initiator at a temperature of about 60 to 180° C. with constant stirring. The reaction time is generally about 1 to 10 hours. As the organic solvent, the same alcohol, ether, ester and hydrocarbon solvents as mentioned hereinbefore can be employed. In the case of a hydrocarbon solvent, it is preferably used in combination with a different type of solvent from the standpoint of solubility.

Examples of free-radical initators are those which are soluble in the polymerization medium such as azobis-(isobutyronitrile), azobis-(alpha, gamma-dimethyl-valeronitrile), azobisdimethyl valeronitrile, tertiary-butylperbenzoate, tertiary-butylperacetate, ditertiarybutyl peroxide, t-butyl peroxy-2-ethylhexanonate and benzoyl peroxide. The free-radical initiator is usually present in amounts of about 0.1 to 10 percent by weight based on total weight of polymerizable alpha, beta-ethylenically unsaturated monomer.

Examples of the chain transfer agents are alkyl mercaptans such as teriary-dodecyl mercaptan. When used, these materials are present in an amount of up to 5 percent by weight based on weight of polymerizable alpha, beta-ethylenically unsaturated monomers.

Among the organic solvents which can be used for the polymerization are those which have a boiling point of at least 50° C. and usually from 110° to 180° C. These include, for example, ketones such as methyl amyl ketone, esters such as hexyl acetate and heptyl acetate; glycol ethers and glycol esters such as propylene glycol monoethyl ether acetate and isobutyl isobutyrate.

The following Examples illustrate the invention. All parts and percentages are on a weight basis unless otherwise indicated. Molecular weights were determined by gel permeation chromotography using a polystyrene standard.

EXAMPLE 1

Veova®/Vinyl Silane/Hydroxypropyl methacrylate (blend) Copolymer

A reactor equipped with a reflux condenser, stirrer, thermometer, nitrogen gas inlet and dropping funnel was charged with a first part consisting of 6 parts of Solvesso® 100 (aromatic solvent blend; Exxon) and 4 parts of n-butanol. This was heated to 125° C. and part 2 consisting of 47.76 parts of Veova® 9 (Shell), vinyltrimethoxy silane (Silquest® A171, OSI), 7.96 parts of hydroxy propyl methacrylate, 5.4 parts of t-butyl peroxy isononanoate (Trigonox® 42S, AKZO) and 1.5 parts of Solvesso® 100 were added dropwise thereto from a dropping funnel over a 5 hour period.

After completin of the addition, a third part of Solvesso® 100 (1 part) was added as rinsing solvent and reactor contents held at reflux for 10 minutes. Afterwards, part 4 consisting of 0.6 parts of di-t-butyl peroxide (Trigonox® B) and 0.4 parts of Solvesso® 100 were added over 20 minutes followed by part 5 (0.5 Solvesso® 100) as rinsing step and the reactor contents were held at reflux for 2 hours. Part 6, consisting of 1 part Solvesso® 100 and 6.25 parts of n-butanol, were finally added to the reactor.

Test results: Solids 78.3% (1 hour dried at 105° C.)

Visosity Y-(Gardner-Holdt)
Acid value 3.5 Mg KOH/gm
Mn 2300
Mw 8800

EXAMPLES 2 to 6

Procedure of Example 1 was followed.

|  | Ex 2 | Ex 3 | Ex 4 | Ex 5 | Ex 6 |
|---|---|---|---|---|---|
| Part 1 | | | | | |
| Solvesso ® 100 | 6 | 6 | 6 | 10 | 10 |
| n-butanol | 4 | 4 | 4 | — | — |
| Part 2 | | | | | |
| Veova ® 9 | 55.72 | — | — | — | — |
| Veova ® 10 | — | 47.76 | 47.76 | 63.68 | 71.64 |
| Silquest ® A171 | 15.92 | 23.88 | 23.88 | 15.92 | 7.96 |
| 2-Hydroxyethyl-methacrylate | 7.96 | 7.96 | — | — | — |
| Hydroxypropyl-methacrylate | — | — | 7.96 | — | — |
| Trigonox ® 21S | — | 5.4 | 5.4 | — | — |
| Solvesso ® 100 | 1.5 | 1.5 | 1.5 | 3.5 | 3.5 |
| VAZO ® 67 (DuPont) | 5.4 | — | — | — | — |
| Trigonox ® B | — | — | — | 3.4 | 3.4 |
| Part 3 | | | | | |
| Solvesso ® 100 | 1 | 1 | 1 | 1 | 1 |
| Part 4 | | | | | |
| Trigonox ® B (AKZO) | 0.5 | 0.6 | 0.6 | 0.6 | 0.6 |
| Solvesso ® 100 | 0.5 | 0.4 | 0.4 | 0.4 | 0.4 |
| Part 5 | | | | | |
| Solvesso ® 100 | 0.5 | 0.5 | 0.5 | 0.5 | 0.5 |
| Part 6 | | | | | |
| Solvesso ® 100 | 1 | 1 | 1 | 7.25 | 7.25 |
| n-Butanol | — | 6.25 | 6.25 | — | — |
| Test Results | | | | | |
| Solids | 80.3 | 77.5 | 78.4 | 79.7 | 80.5 |
| Viscosity | >Z6 | X + ¼ | S | I | Q |
| Acid value | 3.6 | 2.9 | 3.4 | 2 | 2.3 |
| Mn | 3000 | 3200 | 2300 | 1100 | 1100 |
| Mw | 24300 | 25700 | 7100 | 2200 | 2400 |

Procedure 1

Maleate Adduct; Component C

A reactor equipped with stirrer, thermometer, reflux condenser, nitrogen gas inlet and a dropping funnel was charged with 146 parts of trimethylpentane diol, 98 parts of maleic anhydride and 61 parts of methyl isobutyl ketone and the mixture was refluxed for 2 hours.

Part 2 consisting of 260 parts of Cardura® E10 (Shell) and 65 parts of Solvesso® 100 was then added to the reactor and the content was refluxed until the acid value was lower than 2.

| Test Results: | |
|---|---|
| Solids | 81% |
| Viscoisty | H |
| Acid value | 0.1 |
| Mn | 500 |
| Mw | 840 |

Procedure 2

Maleate Adduct; Component C

Procedure 1 was repeated except that the initial reactor charge was 108 parts benzylalcohol, 98 parts Cardura® E10 and 51 parts of methyl isobutyl ketone.

| Test Result: | |
|---|---|
| Solids | 81.9% |
| Viscosity | C |
| Acid value | 1.3 |
| Mn | 370 |
| Mw | 710 |

Procedure 3

Maleate Adduct; Component C

First, 582 parts of the product of Procedure 1 was refluxed with 168 parts of methylhexahydrophthalic anhydride and 50 parts of Solvesso® 100 for 2 hours. Then, 260 parts of Cardura® E10 and 57 parts of Solvesso® 100 were added and the mixture refluxed until the acid value was below 2.

| Test results: | |
|---|---|
| Solids | 80.5% |
| Viscosity | U |
| Acid value | 03 |
| Mn | 650 |
| Mw | 1370 |

EXAMPLES 7 to 11

Procedure of Example 1 was repeated with following changes:

| | Ex 7 | Ex 8 | Ex 9 | Ex 10 | Ex 11 |
|---|---|---|---|---|---|
| Part 1 | | | | | |
| Maleate Procedure 1 | — | 9.95 | — | — | — |
| Maleate Procedure 2 | 19.80 | — | — | — | — |
| Maleate Procedure 3 | — | — | 39.8 | — | — |
| Solvesso ® 100 | 6 | 5 | — | 7 | 10 |
| n-butanol | 0.02 | 3 | 4 | 3 | — |
| Part 2 | | | | | |
| Silquest ® A151[1] | — | — | — | 40 | 40.65 |
| Silquest ® A171[2] | 23.88 | 23.88 | 23.88 | — | — |
| Veova ® 9 | — | 47.76 | 23.88 | 40 | 40.65 |
| Veova ® 10 | 39.8 | — | — | — | — |
| Trigonox ® 425 | 5.4 | 5.2 | 3.2 | 5.4 | — |
| Solvesso ® 100 | 1.5 | 1.7 | 2.2 | 1.5 | 2 |
| Trigonox ® B | — | — | — | — | 3.7 |
| Part 3 | | | | | |
| Solvesso ® 100 | 1 | 1 | 1 | 1 | 1 |
| Part 4 | | | | | |
| Solvesso ® 100 | 0.4 | 0.4 | 0.8 | 0.4 | 0.1 |
| Trigonox ® B | 0.6 | 0.6 | 0.2 | 0.6 | 0.4 |
| Part 5 | | | | | |
| Solvesso ® 100 | 0.5 | 0.5 | 1 | 0.6 | 0.5 |
| Part 6 | | | | | |
| Solvesso ® 100 | 1 | 1 | 5 | — | — |
| n-Butanol | — | — | 5.5 | 1 | 1 |
| Test Results | | | | | |
| Solids | 83.8 | 83 | 70.8 | 87.2 | 90 |
| Viscosity | V + ½ | Z1 + ¼ | H | A | H |

| | Ex 7 | Ex 8 | Ex 9 | Ex 10 | Ex 11 |
|---|---|---|---|---|---|
| Acid value | 5.5 | 4 | 5 | 4.3 | 0.2 |
| Mn | 800 | 1160 | 2400 | 1600 | 1600 |
| Mw | 1420 | 6100 | 13500 | 5300 | 5100 |

[1]Silquest ® A151 comprises

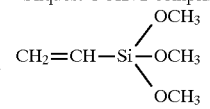

[2]Silquest ® A171 comprises

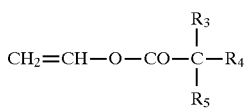

EXAMPLE 12

A clearcoat paint formulated with the copolymer of Example 5 was applied wet-on-wet over a blue commercial basecoat and baked for 30 minutes at 135° C. A transparent solvent—resistant coating was obtained with a gloss of 85, Buckholz hardness of 125 and good acid etch resistance.

What is claimed is:

1. A crosslinkable copolymeric composition having a weight average molecular weight below about 40,000, a hydroxyl value from about 20 to 160, and an acid value below about 20, derived from A, B and optionally, C, wherein:

A is 5 to 95% by weight of A, B and C of a vinyl silane having the formula:

$$CH_2=CH-Si\left(R_2\right)_{3-m}^{(R_1)_m}$$

where $R_1$ is an aryl or alkyl group having 1 to 10 carbon atoms and $R_2$ is a hydrolysable group;

B is 5 to 95% by weight of a vinyl ester of a branched fatty acid having the formula $$CH_2=CH-O-CO-\underset{R_5}{\overset{R_3}{\underset{|}{C}}}-R_4$$

wherein $R_3$, $R_4$, $R_5$ are hydrogen or alkyl groups with 1 to 12 carbon atoms and wherein the total of $R_3$, $R_4$ and $R_5$ contain at least 3 carbon atoms; and C is 0 to 90% by weight of a different polymerizable olefinically unsaturated compound.

2. A composition according to claim 1 having a weight average molecular weight between about 1,500 to 10,000, a hydroxyl value from about 20 to 160, and an acid value below about 10.

3. A composition according to claim 2 wherein A is 10 to 60%, B is 10 to 90% and C is 5 to 60% of the total weight of A, B and C.

4. A composition according to claim 3 wherein A is 10 to 50%, B is 10 to 50%, and C is 10 to 50% of the total weight of A, B and C.

5. A composition according to claim 1 wherein m=0 and $R_2$ is methoxy or ethoxy.

6. A composition according to claim 1 wherein C is selected from vinyl aromatics, (meth)acrylates, and derivatives of maleic, fumaric and itaconic acids.

7. A composition according to claim 5 having a weight average molecular weight of about 1,500 to 10,000, a hydroxyl value from about 20 to 160, and an acid value below about 10, A being present at 10 to 60%, B at 10 to 90% and C at 5 to 60% of the total weight of A, B and C.

8. A composition according to claim 1, wherein B is derived from at least one member of the group pivalic and versatic acids 9, 10 and 11.

9. A composition according to claim 6 having a weight average molecular weight of about 1,500 to 10,000, a hydroxyl value from about 20 to 160, and an acid value below about 10, A being present at 10 to 60%, B at 10 to 90% and C at 5 to 60% of the total weight of A, B and C.

10. A composition according to claim 1 comprising
(i) from 20 to 80 percent by weight of a composition of A, B and optionally C;
(ii) from 10 to 40 percent by weight of a nonaqueous dispersion of a polymer in a nonaqueous medium; and
(iii) from 10 to 70 percent by weight of a crosslinking agent selected from one or both of an isocyanate and melamine crosslinker.

11. A composition according to claim 10 comprising
(i) from 40 to 70 percent by weight of A, B and C;
(ii) from 10 to 30 percent by weight of a nonaqueous dispersion of polymer; and
(iii) from 10 to 50 percent by weight of a crosslinker selected from isocyanate and melamine.

12. A composition according to claim 11 wherein the crosslinker is isocyanate.

13. A composition according to claim 11 wherein the crosslinker is melamine.

14. A substrate coated with the composition according to claim 1.

15. A composition according to claim 8 having a weight average molecular weight of about 1,500 to 10,000, a hydroxyl value from about 20 to 160, and an acid value below about 10, A being present at 10 to 60%, B at 10 to 90% and C at 5 to 60% of the total weight of A, B and C.

16. A composition according to claim 12 wherein the isocyanate is selected from at least one member of the group consisting of hexamethylene diisocyanate and isophorone diisocyanate.

17. A composition according to claim 13 wherein the melamine is selected from at least one member of the group consisting of methylated, butylated and isobutylated melamine formaldehyde.

* * * * *